United States Patent
Valafar et al.

(10) Patent No.: US 10,551,935 B2
(45) Date of Patent: Feb. 4, 2020

(54) WEARABLE COMPUTING DEVICE FEATURING MACHINE-LEARNING-BASED SMOKING DETECTION

(71) Applicant: University of South Carolina, Columbia, SC (US)

(72) Inventors: Homayoun Valafar, Elgin, SC (US); Casey A. Cole, Simpsonville, SC (US); James F. Thrasher, Columbia, SC (US); Scott M. Strayer, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 15/948,259

(22) Filed: Apr. 9, 2018

(65) Prior Publication Data

US 2018/0292910 A1  Oct. 11, 2018

Related U.S. Application Data

(60) Provisional application No. 62/483,042, filed on Apr. 7, 2017.

(51) Int. Cl.
*G06F 3/01* (2006.01)
*G06K 9/00* (2006.01)
*G06F 3/0346* (2013.01)

(52) U.S. Cl.
CPC .............. *G06F 3/017* (2013.01); *G06F 3/014* (2013.01); *G06F 3/0346* (2013.01); *G06K 9/00335* (2013.01); *G06K 9/00355* (2013.01)

(58) Field of Classification Search
None
See application file for complete search history.

(56) References Cited

U.S. PATENT DOCUMENTS

2016/0359992 A1  12/2016  Nawab et al.
2017/0262064 A1*  9/2017  Ofir .......................... G06F 3/00
(Continued)

FOREIGN PATENT DOCUMENTS

GB   2546737      2/2017
WO   WO2016/100368  6/2016
WO   WO2017/129946  8/2017

OTHER PUBLICATIONS

Cho, et al., "SmartBuckle,Human Activity Recognition Using a 3-axis Accelerometer and a Wearable Camera" in *Proceedings of the 2nd International Workshop on Systems and Networking Support for Health Care and Assisted Living Environments—HealthNet '08*, 2008, p. 1.

(Continued)

*Primary Examiner* — Joseph R Haley
(74) *Attorney, Agent, or Firm* — Dority & Manning, P.A.

(57) ABSTRACT

The present disclosure provides a wearable computing device. The wearable computing device includes one or more sensors that output sensor data. The wearable computing device includes a machine-learned smoking gesture detection model trained to detect a smoking gesture based on the sensor data. The wearable computing device includes one or more processors and one or more non-transitory computer-readable media that store instructions that, when executed by the one or more processors, cause the one or more processors to perform operations. The operations include inputting the sensor data into the machine-learned smoking gesture detection model. The operations include receiving, as an output of the machine-learned smoking gesture detection model, a gesture classification that indicates whether the sensor data is indicative of the smoking gesture. The operations include determining whether a user (Continued)

of the wearable computing device is engaging in a smoking session based at least in part on the gesture classification.

16 Claims, 4 Drawing Sheets

(56) References Cited

U.S. PATENT DOCUMENTS

2019/0011989 A1* 1/2019 Schwesig ............ G06K 9/00201
2019/0094979 A1* 3/2019 Hall ...................... G06F 3/0346

OTHER PUBLICATIONS

Cole, et al., "Recognition of Smoking Gesture Using Smart Watch Technology," in *Proceedings of the International Conference on Health Informatics and Medical Systems (HIMS)*, 2016.

Khati, et al., "What distinguishes successful from unsuccessful tobacco smoking cessation? Data from a study of young adults (TEMPO).," *Prev. Med. reports*, vol. 2, pp. 679-685, Jan. 2015.

Li, et al., "Smoking and Risk of All-cause Deaths in Younger and Older Adults: A Population-based Prospective Cohort Study Among Beijing Adults in China.," *Medicine (Baltimore).*, vol. 95, No. 3, p. e2438, Jan. 2016.

Maurer, et al., "Activity Recognition and Monitoring Using Multiple Sensors on Different Body Positions," in *International Workshop on Wearable and Implantable Body Sensor Networks (BSN '06)*, 2006, pp. 113-116.

Parate, et al., "RisQ: Recognizing Smoking Gestures with Inertial Sensors on a Wristband.," *MobiSys . . . Int. Conf. Mob. Syst. Appl. Serv. Int. Conf. Mob. Syst. Appl. Serv.*, vol. 2014, pp. 149-161, Jun. 2014.

Rooney, et al., "Quit and Win smoking cessation contest for Wisconsin college students.," *WMJ*, vol. 104, No. 4, pp. 45-49, May 2005.

Saleheen et al., "puffMarker," in *Proceedings of the 2015 ACM International Joint Conference on Pervasive and Ubiquitous Computing—UbiComp '15*, 2015, pp. 999-1010.

Weiss, et al., "Smartwatch-based Activity Recognition: A Machine Learning Approach," in *Proceedings of the 2016 IEEE International Conference on Biomedical and Health Informatics (BHI 2016)*, 2016, pp. 426-429.

Yang, J. "Toward Physical Activity Diary: Motion Recognition Using Simple Acceleration Features with Mobile Phones," *Proc. 1st Int. Work. Interact. Multimed. Consum. Electron.*, pp. 1-9, 2009.

* cited by examiner

WEARABLE COMPUTING DEVICE FEATURING MACHINE-LEARNING-BASED SMOKING DETECTION

CROSS REFERENCE TO RELATED APPLICATION

This application claims filing benefit of U.S. Provisional Patent Application Ser. No. 62/483,042 having a filing date of Apr. 7, 2017, entitled "Wearable Computing Device Featuring Machine-Learning-Based Smoking Detection," which is incorporated herein by reference for all purposes.

FIELD

The present disclosure relates generally to detection of smoking. More particularly, the present disclosure relates to a wearable computing device that features machine-learning-based detection of a user engaging in a smoking session.

BACKGROUND

In the past decade, measures have been taken to warn the population about the dangers of smoking. While the smoking rate has decreased significantly since then, smoking remains the leading preventable cause of death throughout the world. Additionally, youth tobacco use has increased as the popularity of products such as e-cigarettes and hookah has risen. In America, 53.4% of college students have smoked at least one cigarette and 38.1% reported smoking in the past year.

Even though the hazards of smoking are generally accepted, there remains many smokers who struggle to quit. Those who try to quit are typically middle aged and beginning to feel the adverse effects of smoking. Yet, on average, smokers relapse four times before successfully quitting. Many smokers do not realize that it is normal to require multiple attempts to quit smoking and therefore need recurring intervention and support to aid them. Constant support from an individual's community is shown to increase the likelihood of quitting.

There are a myriad of websites that provide services to smokers such as access to resources, online support and help lines. However, most of these sites do not provide a mobile device-based application for an increasingly mobile population. In recent years smoking cessation mobile applications have also been developed. Most of these applications simply allow the user to enter in the amount of cigarettes that they usually would smoke in a day and then "self-report" any cigarettes that they did smoke and then calculate the money that they would have saved if they hadn't smoked. This self-reporting process is usually unreliable because users cannot always be trusted to keep up with inputting data.

SUMMARY

Aspects and advantages of embodiments of the present disclosure will be set forth in part in the following description, or can be learned from the description, or can be learned through practice of the embodiments.

One example aspect of the present disclosure is directed to a wearable computing device. The wearable computing device includes one or more sensors that output sensor data. The wearable computing device includes a machine-learned smoking gesture detection model trained to detect a smoking gesture based on the sensor data. The wearable computing device includes one or more processors and one or more non-transitory computer-readable media that store instructions that, when executed by the one or more processors, cause the one or more processors to perform operations. The operations include inputting the sensor data into the machine-learned smoking gesture detection model. The operations include receiving, as an output of the machine-learned smoking gesture detection model, a gesture classification that indicates whether the sensor data is indicative of the smoking gesture. The operations include determining whether a user of the wearable computing device is engaging in a smoking session based at least in part on the gesture classification.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to a wearable computing device that features machine-learning-based detection of a user engaging in a smoking session. In particular, the wearable computing device can include one or more sensors and a machine-learned smoking gesture detection model that is trained to detect a smoking gesture based on sensor data output by the one or more sensors. As one particular example, the wearable computing device can be a smartwatch, the one or more sensors can include one or more accelerometers, and the machine-learned smoking gesture detection model can be an artificial neural network (e.g., a deep neural network).

According to one aspect of the present disclosure, the wearable computing device can include a smoking session detector that detects a smoking session based on a plurality of gesture classifications provided by the machine-learned smoking gesture detection model over a number of time periods. Each gesture classification can indicate whether the machine-learned smoking gesture detection model has detected a smoking gesture based on the sensor data for the corresponding time period. As one example, the smoking session detector can be a rules-based system that detects a smoking session when certain condition(s) are met by the gesture classifications that indicate detection of the smoking gesture. As one particular example, a smoking session can be detected when a number of puffs exhibited by detected smoking gestures is greater than a threshold number; a frequency associated with the puffs is greater than a threshold frequency; and one or more durations respectively associated with one or more of the puffs are greater than a threshold duration. For example, puffs can correspond to sustained periods in which the smoking gesture is detected. Thus, the smoking session detector can provide an additional layer of intelligence beyond the basic detection of a smoking gesture by the machine-learned model, thereby reducing false positives.

According to another aspect of the present disclosure, the wearable computing device can be robust against the possibility of the wearable computing device being worn in a number of different orientations. In one example, the machine-learned smoking gesture detection model can be trained to detect the smoking gesture regardless of the device orientation. For example, the smoking gesture detection model can have been trained on training data that includes positive training examples from each possible orientation. In another example, a calibration step can be performed in which the user specifies the orientation in which the device is worn or the user performs a calibration gesture from which the orientation of the device can be ascertained. The device can store information sufficient to rotate or transform the sensor data into an anchor orientation based on the identified orientation. In other examples, the calibration step is not required. For example, in some implementations, the wearable computing device can include a plurality of smoking gesture detection models that are respectively trained to detect the smoking gesture when the device is worn in the different orientations. The smoking gesture can be detected if any of the models detect the smoking gesture. In another example, the wearable computing device can rotate or transform the sensor data according to each of a plurality of sets of rotation parameters respectively associated with the plurality of possible orientations. Each set of rotated data can be input into the machine-learned smoking gesture detection model (e.g., in parallel or sequentially). If the model provides a positive classification for one or more of the sets of rotated data, then the smoking gesture can be considered as having been detected.

According to yet another aspect of the present disclosure, in response to a determination that the user of the wearable computing device is engaging in the smoking session, the wearable computing device can perform actions to alert the user, make a record of the smoking session, and/or other actions. For example, the wearable computing device can provide at least one of a visual alert, haptic alert, and an audio alert via an output component of the device. For example, the alert can encourage the user to stop smoking, remind the user they could be saving money or improving health, or other messages. As another example, the wearable computing device can transmit information to a user computing device (e.g., smartphone) associated with the user that indicates that the user of the wearable computing device is engaging in the smoking session. The user computing device can provide an alert, make a record of the session, or other actions. The wearable computing device and/or the user computing device can provide summary statistics based on the recorded smoking sessions (e.g., number of cigarettes smoked, money expended on cigarettes, etc.). Thus, the device and methods of the present disclosure can eliminate the issues associated with self-reporting of smoking sessions and/or provide active monitoring and/or encouragement to reduce smoking session frequency and/or duration.

With reference now to the Figures, example embodiments of the present disclosure will be discussed in further detail.

Figure 1:
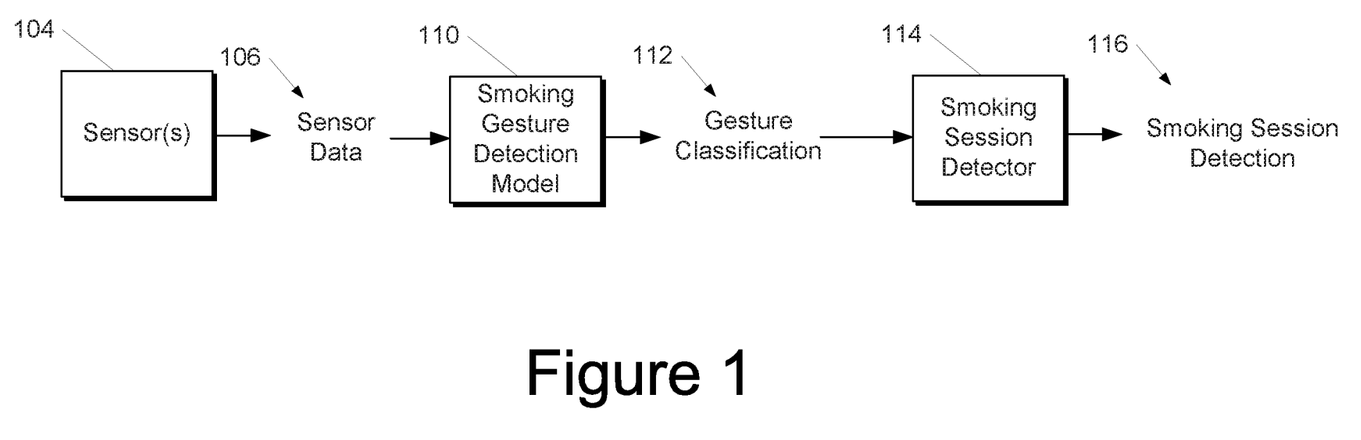
FIG. 1 depicts an example processing workflow for detection of a smoking session according to example embodiments of the present disclosure.

FIG. 1 depicts an example processing workflow for detection of a smoking session according to example embodiments of the present disclosure. For example, the workflow can be performed by or otherwise included in the wearable computing device of the present disclosure.

The workflow of FIG. 1 includes one or more sensors 104 that generate sensor data 106. As examples, the one or more sensors 104 can include one or more accelerometers, a gyroscope, an air quality detection sensor (e.g., a smoke detection sensor), or other types of sensors. Thus, for example, the sensor data 106 can include accelerometer data in an X physical direction, accelerometer data in a Y physical direction, and/or accelerometer data in a Z physical direction. For example, three accelerometers can respectively provide the data for such directions or a single accelerometer can provide the data for all directions. In some implementations, less than all three physical dimensions can be used. For example, in some implementations, only the accelerometer data in the X physical direction is used (e.g., input into the model 110).

Figure 2:
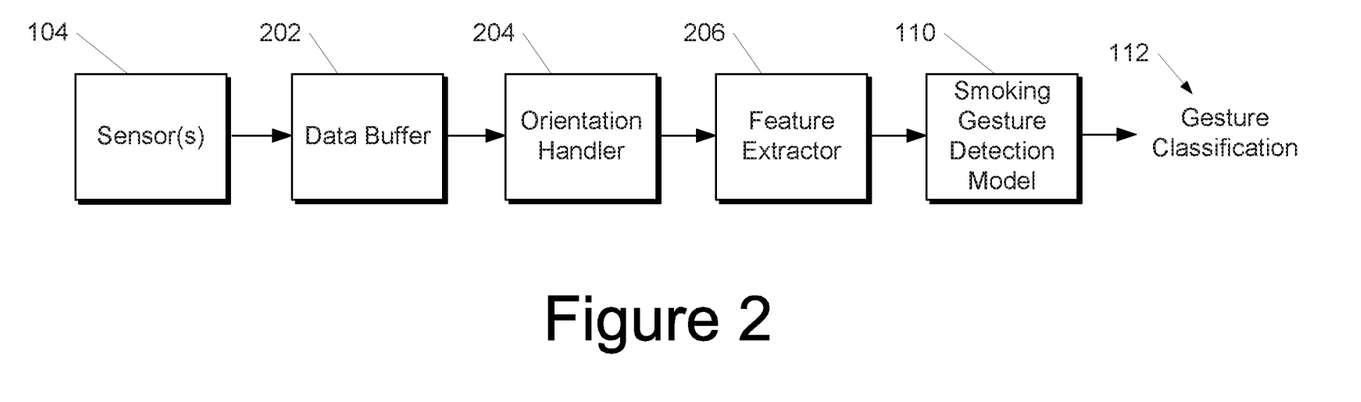
FIG. 2 depicts an example processing workflow for smoking gesture classification according to example embodiments of the present disclosure.

Some or all of the sensor data 106 can be input into a smoking gesture detection model 110. In some implementations, the sensor data 106 can be manipulated and/or preprocessed in some fashion prior to input into the model 110. FIG. 2 provides an example of such preprocessing and will be discussed further below.

Referring still to FIG. 1, the smoking gesture detection model 110 can receive the sensor data 106 (e.g., the raw and/or pre-processed sensor data) and, in response, output a gesture classification 112. In particular, the gesture classification 112 can indicate whether the sensor data 106 was indicative of a smoking gesture. For example, the classification 112 can classify the sensor data 106 as indicative of a smoking gesture (referred to herein as a "positive classification") or can classify the sensor data 106 as not indicative of a smoking gesture (referred to herein as a "negative classification").

In some implementations, the gesture classification 112 can be a numerical value (e.g., between zero and one) that indicates a confidence that the sensor data 106 is indicative of a smoking gesture. In such implementations, if the gesture classification 112 is greater than a threshold confidence value, then it can be viewed as a positive classification (e.g., gesture detected); while if the gesture classification 112 is less than the threshold confidence value, then it can be viewed as a negative classification (e.g., gesture not detected). As one particular example, the threshold confidence value can be 0.5.

According to an aspect of the present disclosure, the smoking gesture detection model 110 can be a machine-learned model. For example, the smoking gesture detection model 110 can be a machine-learned classifier model. As example, the classifier model can be a random forest classifier; a logistic regression classifier; a support vector machine; one or more decision trees; a neural network; and/or other types of models including both linear models and non-linear models. Neural networks can include deep neural networks, feed-forward neural networks, recurrent neural networks (e.g., long short-term memory recurrent neural networks), convolutional neural networks, or combinations thereof. In one particular example, the smoking gesture detection model 110 is a two-layer, multi-perceptron, feed-forward neural network.

The processing workflow of FIG. 1 further includes a smoking session detector 114. The smoking session detector 114 can receive the gesture classifications 112 from the smoking gesture detection model 110 and can output a smoking session detection 116 when a smoking session is detected. More particularly, the smoking gesture detection model 110 can receive a plurality of sets of sensor data 106 over a plurality of time periods and can output, for each time period, a gesture classification 112. As one particular example, the smoking gesture detection model 110 can output a gesture classification 112 at 25 Hertz. To continue the particular example, each gesture classification 112 can be based on the previous 3 seconds worth of sensor data 106.

The smoking session detector 114 can receive all of the gesture classifications 112 output by the smoking gesture detection model 110 over a period of time (e.g., thirty seconds) and can make a more holistic decision as to whether the user is engaging in a smoking session. Thus, the smoking session detector 114 can provide an additional layer of intelligence beyond the basic detection of a smoking gesture by the gesture detection model 110, thereby reducing false positives.

In some implementations, the smoking session detector 114 can be a rules-based system that detects a smoking session when certain condition(s) are met by the gesture classifications 112 that indicate detection of the smoking gesture. As examples, the smoking session detector 114 can detect the smoking session based at least in part on at least one of: a number of positive gesture classifications 112; a frequency associated with the positive gesture classifications; and one or more durations respectively associated with one or more of the positive gesture classifications.

As one particular example, a smoking session can be detected when a number of positive gesture classifications indicative of detection of the smoking gesture is greater than a threshold number; a frequency associated with the positive gesture classifications is greater than a threshold frequency (and optionally less than some second threshold frequency); and one or more durations respectively associated with one or more of the positive gesture classifications are greater than a threshold duration.

In some implementations, the smoking session detector 114 can process the gesture classifications 112 as a number of discrete "puffs." As one example, each sustained period where the gesture classifications (or some acceptable fraction thereof) are greater than the threshold confidence value can be considered as one "puff." Thus, in some implementations, the smoking session detector 114 can detect the smoking session based at least in part on at least one of: a number of puffs; a frequency associated with the puffs; and one or more durations respectively associated with one or more of the puffs.

As one particular example, a smoking session can be detected when the number of puffs is greater than a threshold number; a frequency associated with the puffs is greater than a threshold frequency (and optionally less than some second threshold frequency); and one or more durations respectively associated with one or more puffs are greater than a threshold duration.

FIG. 2 depicts an example processing workflow for smoking gesture classification according to example embodiments of the present disclosure. For example, the workflow can be performed by or otherwise included in the wearable computing device of the present disclosure. The workflow illustrated in FIG. 2 includes the sensors 104, a data buffer 202, an orientation handler 204, and a feature extractor 206.

The data buffer 202 can store or maintain a moving window of sensor data received from the one or more sensors 104. For example, the data buffer 202 can hold the past three seconds worth of sensor data, for each dimension of sensor data. In some implementations, as an example, at least some of the sensors 104 can output data at 25 Hertz. Thus, to continue the example, the data buffer 202 can hold approximately 75 data points for each dimension of sensor data.

The orientation handler 204 can optionally modify the sensor data based on an orientation of the wearable computing device. More particularly, according to another aspect of the present disclosure, the wearable computing device can be robust against the possibility of the wearable computing device being worn in a number of different orientations.

In particular, in some implementations, eight possible orientations can be defined as follows: an LP1 position (left wrist, right side up, in pronated position); an LP2 position (left wrist, upside down, in pronated position); an LP3 position (left wrist, right side up, in supinated position); an LP4 position (left wrist, upside down, in pronated position); an RP1 position (right wrist, right side up, in pronated position); an RP2 position (right wrist, upside down, in pronated position); an RP3 position (right wrist, right side up, in supinated position); and an RP4 position (right wrist, upside down, in pronated position). Right side up can denote that the device (e.g., watch) is positioned such that text on a screen of the device is not upside down.

The orientation handler 204 can be capable of rotating or otherwise transforming the sensor data to account for the orientation in which the device is worn. In particular, in some implementations, the orientation handler 204 can perform Eulerian rotation of Cartesian sensor data to relate the sensor data to an anchor frame or orientation. For example, the following equation shows the Euler transformation that permits full rotation of the space using three consecutive rotations about z, y, z axes:

$$\begin{pmatrix} \cos(\alpha)\cos(\beta)\cos(\gamma) - \sin(\alpha)\sin(\gamma) & -\cos(\alpha)\cos(\beta)\sin(\gamma) - \sin(\alpha)\cos(\gamma) & \cos(\alpha)\sin(\beta) \\ \sin(\alpha)\cos(\beta)\cos(\gamma) + \cos(\alpha)\sin(\gamma) & -\sin(\alpha)\cos(\beta)\sin(\gamma) + \cos(\alpha)\cos(\gamma) & \sin(\alpha)\sin(\beta) \\ -\sin(\beta)\cos(\gamma) & \sin(\beta)\sin(\gamma) & \cos\beta \end{pmatrix}$$

In some implementations, the values for $\alpha$, $\beta$, and $\gamma$ can be retrieved from the following example table, which can be stored in the memory of the device.

| Position | $\alpha$ | $\beta$ | $\gamma$ |
|---|---|---|---|
| LP1 | 0 | 0 | 0 |
| LP2 | 0 | 0 | 180° |

| Position | α | β | γ |
|---|---|---|---|
| LP3 | 180° | 0 | 0 |
| LP4 | 0 | 180° | 0 |
| RP1 | 180° | 0 | 0 |
| RP2 | 0 | 180° | 0 |
| RP3 | 180° | 180° | 180° |
| RP4 | 0 | 0 | 180° |

In some implementations, a calibration step can be performed in which the user specifies the orientation in which the device is worn. For example, the user can select the correct orientation via a graphical user interface. The orientation of the device specified by the user can be stored in memory. The orientation handler 204 can use the specified orientation (and corresponding rotation parameters) to rotate the sensor data to the anchor frame or orientation prior to input into the smoking gesture detection model 110.

In another example, at the calibration step, the user can perform a calibration gesture such as mimicking a smoking gesture while wearing the device. The orientation of the device can be determined from the calibration gesture. For example, calibration data collected during performance of the calibration gesture can be compared to exemplary datasets for each orientation. The orientation associated with the dataset that matches best to the calibration data can be selected as the orientation in which the device is currently being worn. The orientation handler 204 can use knowledge of the identified orientation to rotate the sensor data to the anchor frame or anchor orientation prior to input into the smoking gesture detection model 110.

Figure 3:
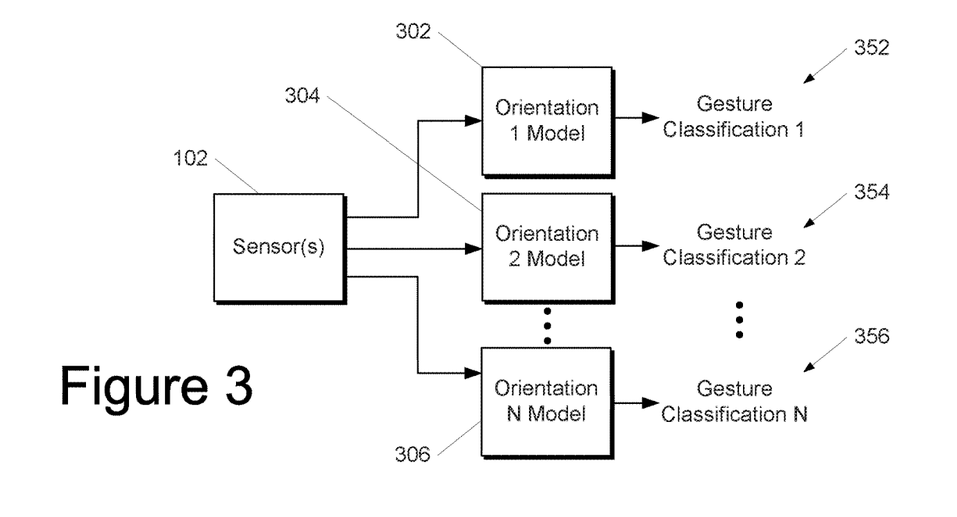
FIG. 3 depicts an example processing workflow for smoking gesture classification according to example embodiments of the present disclosure.
Figure 4:
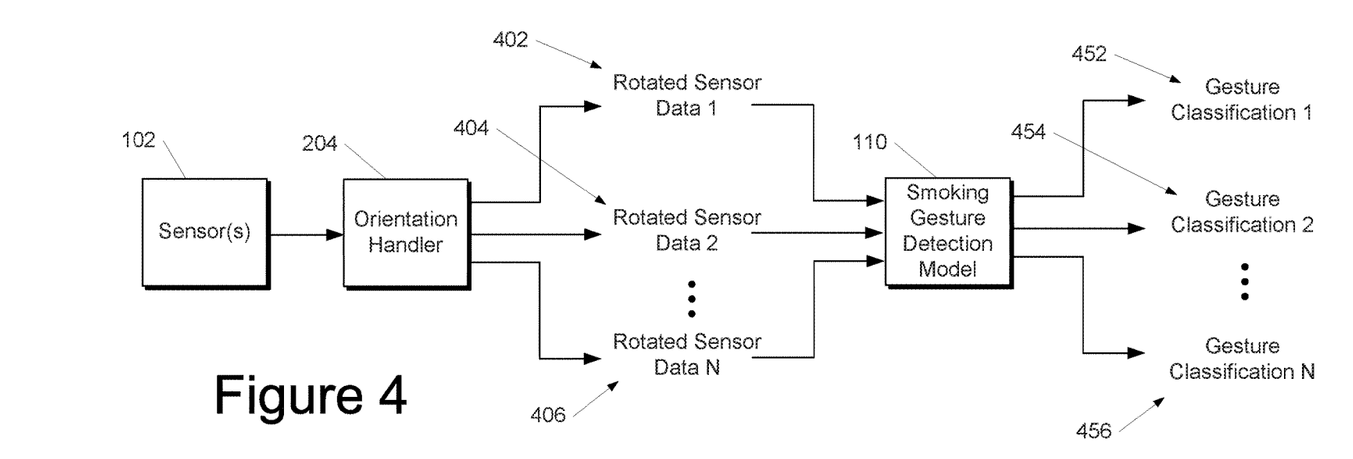
FIG. 4 depicts an example processing workflow for smoking gesture classification according to example embodiments of the present disclosure.

In other implementations, the calibration step is not required or used. As examples, FIGS. 3 and 4 provide example processing workflows that resolve orientation ambiguity without requiring the calibration step. In addition, in some implementations, the device does not include the orientation handler 204.

The example workflow illustrated in FIG. 2 further includes a feature extractor 206. The feature extractor 206 can extract one or more features from the sensor data. For example, in addition or alternatively to the raw sensor data, certain features can be extracted and input into the smoking gesture detection model 110 for use in making gesture classifications.

As one example, the feature extractor 206 can compute an average of the accelerometer data in the X, Y, and Z physical dimensions. As another example, the feature extractor 206 can compute one or more transformations in a frequency domain of one or more of: the accelerometer data in the X physical dimension, the accelerometer data in the Y physical dimension, the accelerometer data in the Z physical dimension, and the average of the X, Y, and Z data. As yet another example, the feature extractor 206 can compute one or more statistics derived from one or more of the accelerometer data in the X physical dimension, the accelerometer data in the Y physical dimension, the accelerometer data in the Z physical dimension, and the average of the X, Y, and Z data. Example statistics include mean, maximum, minimum, etc. for each data type. Many other features can be extracted as well, including, for example, features extracted from gyroscope data. In some implementations, the device does not include the feature extractor 206.

The orientation handler 204 and the feature extractor 206 can each include computer logic utilized to provide desired functionality. In some implementations, each of the orientation handler 204 and the feature extractor 206 can be implemented in hardware, firmware, and/or software controlling a general purpose processor. For example, in some implementations, each of the orientation handler 204 and the feature extractor 206 includes program files stored on a storage device, loaded into a memory and executed by one or more processors. In other implementations, each of the orientation handler 204 and the feature extractor 206 includes one or more sets of computer-executable instructions that are stored in a tangible computer-readable storage medium such as RAM hard disk or optical or magnetic media.

FIG. 3 depicts an example processing workflow for smoking gesture classification according to example embodiments of the present disclosure. For example, the workflow can be performed by or otherwise included in the wearable computing device of the present disclosure.

The workflow includes the one or more sensors 102 and a plurality of machine-learned smoking gesture detection models, which are illustrated as models 302, 304, and 306. The plurality of models can be respectively associated with a plurality of different potential device orientations. In particular, each machine-learned smoking gesture detection model can have been trained based at least in part on one or more positive training examples that include sensor data descriptive of the smoking gesture performed with the corresponding device orientation.

To provide an example, in some implementations, the wearable computing device can include eight smoking gesture detection models that respectively correspond to the eight possible device orientations defined above. Each model is trained on training data specific to the corresponding orientation. Thus, for example, the eight models can include an LP2 model that was trained on training data that includes smoking gestures performed while a device was worn in the LP2 orientation.

Referring again to FIG. 3, the sensor data from the one or more sensors 102 can be respectively input (e.g., in parallel) into each of the models 302, 304, and 306. Each model can output a respective gesture classification, shown at 352, 354, and 356. In some implementations, if any of the gesture classifications 352-356 are positive, then such can be viewed as a positive classification (e.g., smoking gesture detected). This may be viewed as application of the logical OR operation to the classifications 352-356. Thus, through use of multiple models trained on different orientations, smoking gestures can be detected without knowledge of the specific, current orientation of the device.

FIG. 4 depicts an example processing workflow for smoking gesture classification according to example embodiments of the present disclosure. For example, the workflow can be performed by or otherwise included in the wearable computing device of the present disclosure.

The workflow of FIG. 4 includes the orientation handler 204 receiving sensor data from the one or more sensors 102. The orientation handler 204 respectively transforms the sensor data according to a plurality of sets of rotation parameters to obtain a plurality of sets of rotated sensor data, as shown at 402, 404, and 406. The plurality of sets of rotation parameters are respectively associated with a plurality of potential device orientations.

As an example, in some implementations, the orientation handler 204 can rotate the sensor data according to each of the eight sets of parameters included in the table above to form eight sets of rotated sensor data.

Each set of rotated sensor data 402-406 can be input into the smoking gesture detection model 110. For example, the sets of rotated sensor data 402-406 can be sequentially input into the same instance of the smoking gesture detection model 110. Alternatively, the sets of rotated sensor data 402-406 can be input in parallel into the multiple parallel instances of the same smoking gesture detection model 110. The smoking gesture detection model 110 can respectively output a gesture classification (shown at 452, 454, and 456) for each set of input sensor data 402, 404, and 406. In some implementations, if any of the gesture classifications 452-456 are positive, then such can be viewed as a positive classification (e.g., smoking gesture detected). This may be viewed as application of the logical OR operation to the classifications 452-456. Thus, through use of multiple sets of rotated sensor data, smoking gestures can be detected without knowledge of the specific, current orientation of the device.

Figure 5:
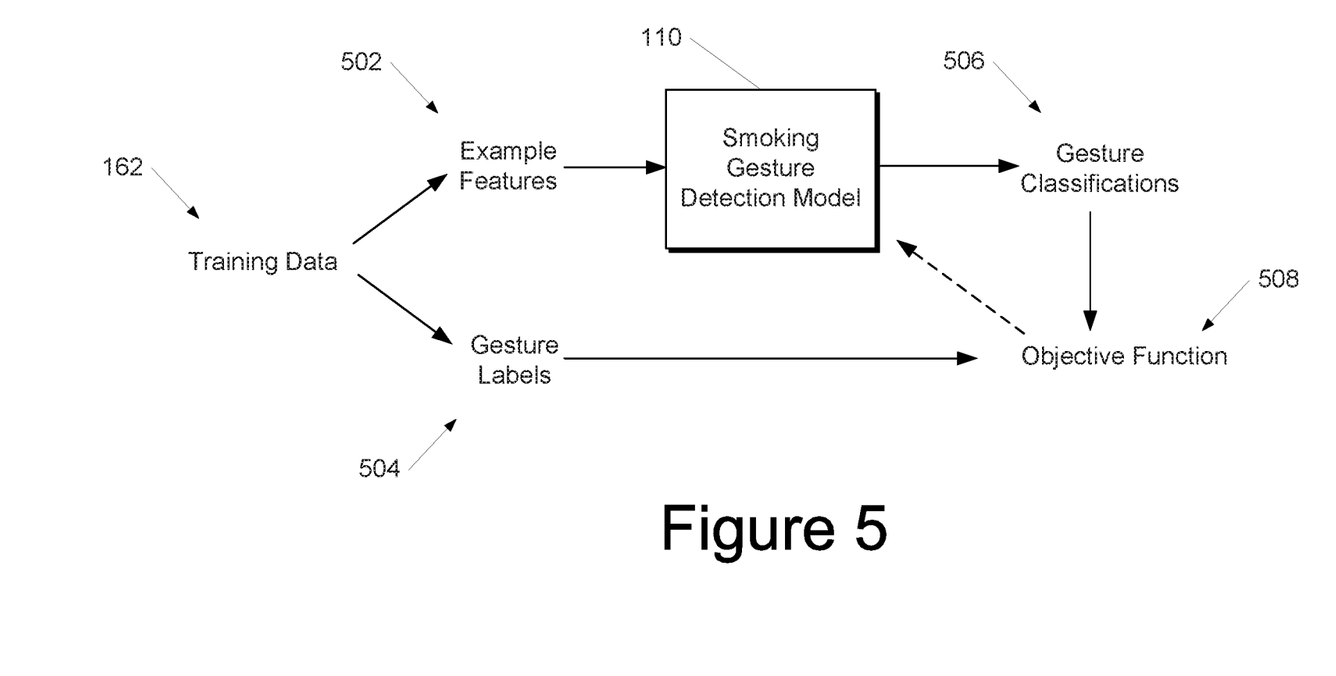
FIG. 5 depicts an example processing workflow for training a smoking gesture detection model according to example embodiments of the present disclosure.

FIG. 5 depicts an example workflow for training a smoking gesture detection model 110 according to example embodiments of the present disclosure. For example, the workflow can be performed by a machine learning computing system.

The training process begins with a set of training data 162. Generally, the training data includes a number of training examples. Each training example can include example features 502 that are labelled with a gesture label 504 that indicates whether the particular features 502 correspond to a smoking gesture or do not correspond to a smoking gesture. Thus, the training data 162 can include positive training examples that include features 502 labelled as corresponding to a smoking gesture and negative training examples that include features 502 labelled as not corresponding to a smoking gesture. The features 502 can include any of the types of data described above, including, for example, raw sensor data (e.g., raw X, Y, and/or Z dimension accelerometer data) and/or features extracted from the sensor data (e.g., AVG of X, Y, and Z; frequency domain features; statistical parameters; etc.).

Each set of example features 502 can be input into the smoking gesture detection model 110. In response, the model 110 can output a respective gesture classification 506 for each set of example features 502. An objective function 508 can evaluate a difference between the gesture classification 506 for each set of example features 502 and the gesture label 504 associated with such set of features 502. The objective function 508 can be backpropagated through the smoking gesture detection model 110 to train the model 110. For example, backpropagating the objective function 508 can include performing Levenberg-Marquardt backpropagation.

In some implementations, the training data 162 can include one or more positive training examples that include sensor data indicative of the smoking gesture and one or negative training examples that include sensor data indicative of one or more of: a facial scratching gesture, a lipstick applying gesture, a yawning gesture, a coughing gesture, an eating gesture, and a drinking gesture. Inclusion of negative training examples that correspond to such actions assists in training the model 110 to discriminate against such closely physically analogous actions and makes the model 110 more robust against false positives.

In some implementations, the training data 162 can include a plurality of positive training examples for each of a plurality of different potential device orientations. Thus, once the model 110 has been trained on such data, it is able to detect a smoking gesture regardless of the current orientation of the wearable computing device.

Figure 6:
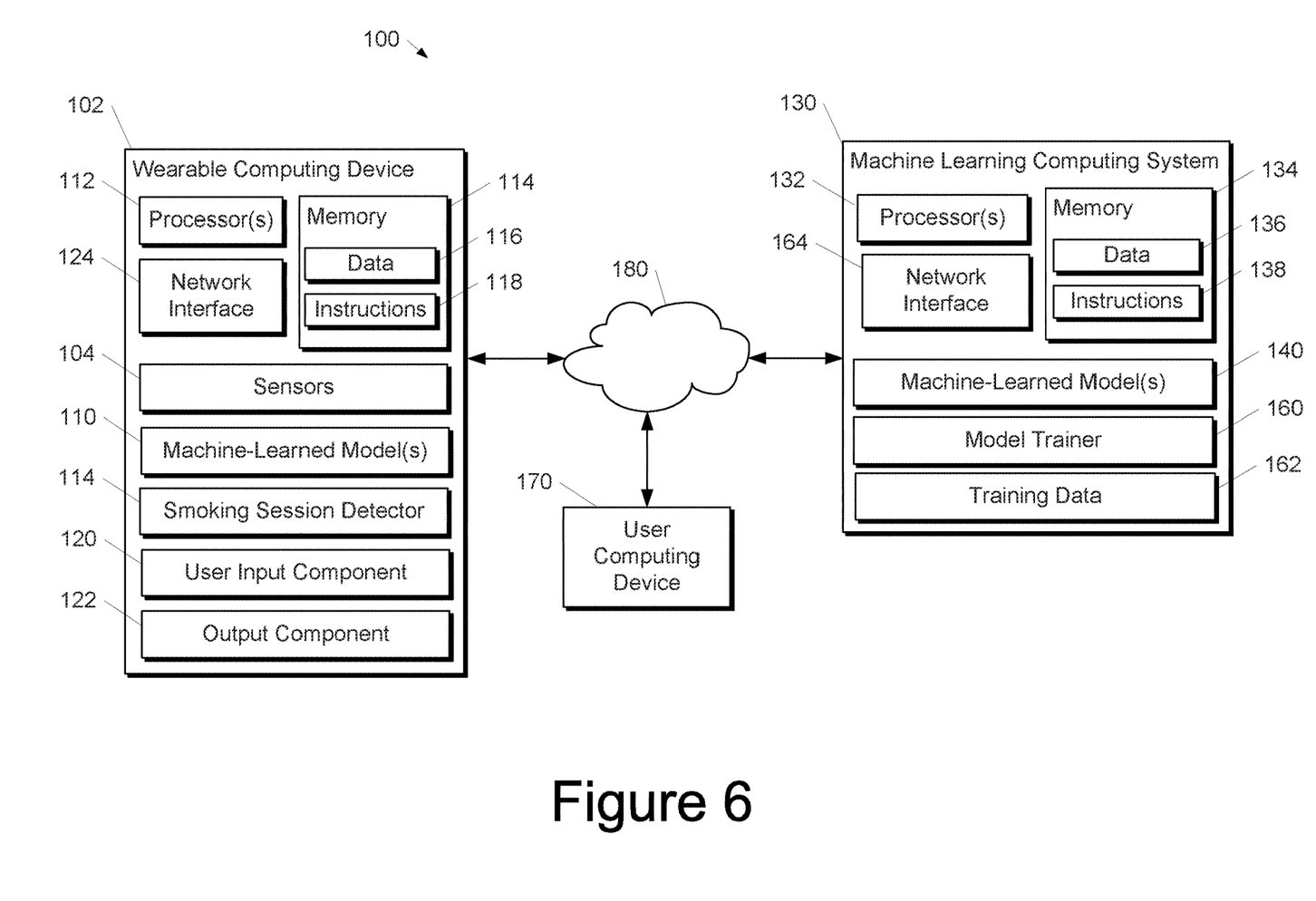
FIG. 6 depicts an example computing system for machine-learning-based smoking detection according to example embodiments of the present disclosure.

FIG. 6 depicts an example computing system 100 for machine-learning-based smoking detection according to example embodiments of the present disclosure. The example system 100 includes a wearable computing device 102 and a machine learning computing system 130 that are communicatively coupled over a network 180.

The wearable computing device 102 can be a computing device with the form factor of a watch, a ring, a glove, or other wearable item. As another example, the wearable computing device 102 can be embedded within a sleeve of a shirt or other clothing item.

The wearable computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the wearable computing device 102 can obtain data from one or more memory device(s) that are remote from the device 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

According to an aspect of the present disclosure, the wearable computing device 102 can store or include one or more machine-learned classifier models 110. For example, the classifier models 110 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), or other forms of neural networks.

In some implementations, the wearable computing device 102 can receive the one or more machine-learned models 110 from the machine learning computing system 130 over network 180 and can store the one or more machine-learned models 110 in the memory 114. The wearable computing device 102 can then use or otherwise implement the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the wearable computing device 102, the machine learning computing system 130 can include one or more machine-learned models 140. For example, the models 140 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), or other forms of neural networks.

As an example, the machine learning computing system 130 can communicate with the wearable computing device 102 according to a client-server relationship. For example, the machine learning computing system 140 can implement the machine-learned models 140 to provide a web service to the wearable computing device 102. For example, the web service can provide a smoking detection service.

Thus, machine-learned models 110 can located and used at the wearable computing device 102 and/or machine-learned models 140 can be located and used at the machine learning computing system 130.

In some implementations, the machine learning computing system 130 and/or the wearable computing device 102 can train the machine-learned models 110 and/or 140 through use of a model trainer 160. The model trainer 160 can train the machine-learned models 110 and/or 140 using one or more training or learning algorithms. One example training technique is backwards propagation of errors ("backpropagation"). For example, backpropagation can include Levenberg-Marquardt backpropagation. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The model trainer 160 can be implemented in hardware, software, firmware, or combinations thereof.

The wearable computing device 102 can also include a network interface 124 used to communicate with one or more systems or devices, including systems or devices that are remotely located from the wearable computing device 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The wearable computing device 102 can also include a user input component 120. For example, the user input component 120 can include a microphone, a keypad, a keyboard, a click-wheel, buttons, and/or a touch-sensitive screen.

The wearable computing device 102 can also include an output component 122. For example, the output component 122 can include a speaker, a haptic output component, and/or a display.

In response to a determination that the user of the wearable computing device 102 is engaging in the smoking session, the wearable computing device 102 can perform actions to alert the user, make a record of the smoking session (e.g., in memory 114), and/or other actions. For example, the wearable computing device 102 can provide at least one of a visual alert, a haptic alert, and an audio alert via the output component 122 of the device 102. For example, the alert can encourage the user to stop smoking, remind the user they could be saving money or improving health, or other messages.

As another example, the wearable computing device 102 can transmit information to a user computing device 170 (e.g., smartphone) associated with the user that indicates that the user of the wearable computing device 102 is engaging in the smoking session. The wearable computing device 102 can communicate with the user computing device 170 over the network 180 and/or via a local, short-range wireless communication protocol (e.g., Bluetooth).

The user computing device 170 can provide an alert, make a record of the session, etc. The wearable computing device 102 and/or the user computing device 170 can provide summary statistics based on the recorded smoking sessions (e.g., number of cigarettes smoked, money expended on cigarettes, etc.).

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 6 illustrates one example computing system 100 that can be used to implement the present disclosure. Other computing systems can be used as well. For example, in some implementations, the wearable computing device 102 can include the model trainer 160 and the training dataset 162. In such implementations, the machine-learned models 110 can be both trained and used locally at the wearable computing device 102. As another example, in some implementations, the wearable computing device 102 is not connected to other computing systems.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device, the wearable computing device comprising:
   one or more sensors that output sensor data;
   a machine-learned smoking gesture detection model trained to detect a smoking gesture based on the sensor data;
   one or more processors; and
   one or more non-transitory computer-readable media that store instructions that, when executed by the one or more processors, cause the one or more processors to perform operations, the operations comprising:
      inputting the sensor data into the machine-learned smoking gesture detection model;
      receiving, as an output of the machine-learned smoking gesture detection model, a gesture classification that indicates whether the sensor data is indicative of the smoking gesture; and
      determining whether a user of the wearable computing device is engaging in a smoking session based at least in part on the gesture classification, wherein the machine-learned smoking gesture detection model has been trained on a training data that includes a plurality of positive training examples for each of a plurality of different potential device orientations.

2. The wearable computing device of claim 1, wherein the machine-learned smoking gesture detection model comprises an artificial neural network.

3. The wearable computing device of claim 1, wherein inputting the sensor data into the machine-learned smoking gesture detection model comprises:
   obtaining a plurality of sets of sensor data respectively for a plurality of time periods; and
   respectively inputting the plurality of sets of the sensor data into the machine-learned smoking gesture detection model;
   receiving the gesture classification comprises receiving, as an output of the machine-learned smoking gesture detection model, a plurality of gesture classifications that respectively indicate whether the plurality of sets of sensor data are respectively indicative of the smoking gesture; and
   determining whether the user of the wearable computing device is engaging in the smoking session comprises determining whether the user of the wearable computing device is engaging in the smoking session based at least in part on the plurality of gesture classifications.

4. The wearable computing device of claim 3, wherein determining whether the user of the wearable computing device is engaging in the smoking session based at least in part on the plurality of gesture classifications comprises determining whether the user of the wearable computing device is engaging in the smoking session based at least in part on at least one of:
   a number of puffs exhibited by the plurality of gesture classifications;
   a frequency associated with the puffs; and
   one or more durations respectively associated with one or more of the puffs.

5. The wearable computing device of claim 3, wherein each set of sensor data comprises three seconds of the sensor data.

6. The wearable computing device of claim 1, wherein the wearable computing device is designed to be worn about a wrist of the user.

7. The wearable computing device of claim 1, wherein the one or more sensors comprise one or more of:
   one or more accelerometers; and
   a gyroscope.

8. The wearable computing device of claim 1, wherein the sensor data comprises one or more of:
   accelerometer data in an X physical dimension;
   accelerometer data in a Y physical dimension;
   accelerometer data in a Z physical dimension;
   an average of the accelerometer data in the X physical dimension, the accelerometer data in the Y physical dimension, and the accelerometer data in the Z physical dimension;
   one or more transformations in a frequency domain of one or more of: the accelerometer data in the X physical dimension, the accelerometer data in the Y physical dimension, the accelerometer data in the Z physical dimension, and the average; and
   one or more statistics derived from one or more of the accelerometer data in the X physical dimension, the accelerometer data in the Y physical dimension, the accelerometer data in the Z physical dimension, and the average of the accelerometer data in the X physical dimension, the accelerometer data in the Y physical dimension, and the accelerometer data in the Z physical dimension.

9. The wearable computing device of claim 1, wherein inputting the sensor data into the machine-learned smoking gesture detection model comprises:
   extracting one or more features from the sensor data; and
   inputting the one or more extracted features into the machine-learned smoking gesture detection model.

10. The wearable computing device of claim 1, wherein extracting the one or more features comprises computing one or more of:

an average of accelerometer data in an X physical dimension, accelerometer data in a Y physical dimension, and accelerometer data in a Z physical dimension;

one or more transformations in a frequency domain of one or more of: the accelerometer data in the X physical dimension, the accelerometer data in the Y physical dimension, the accelerometer data in the Z physical dimension, and the average in a frequency domain; and one or more statistics derived from one or more of the accelerometer data in the X physical dimension, the accelerometer data in the Y physical dimension, the accelerometer data in the Z physical dimension, and the average of the accelerometer data in the X physical dimension, the accelerometer data in the Y physical dimension, and the accelerometer data in the Z physical dimension.

11. The wearable computing device of claim 1, wherein the operations further comprise, in response to a determination that the user of the wearable computing device is engaging in the smoking session, one or more of:

providing at least one of a visual alert and an audio alert via an output component of the wearable computing device; and transmitting information to a user computing device associated with the user that indicates that the user of the wearable computing device is engaging in the smoking session.

12. The wearable computing device of claim 1, wherein the operations further comprise:

receiving a calibration input from the user that specifies a device orientation associated with the wearable computing device; and prior to inputting the sensor data into the machine-learned smoking gesture detection model, transforming the sensor data based at least in part on the device orientation specified by the calibration input and one or more rotation parameters associated with the specified device orientation;

wherein inputting the sensor data into the machine-learned smoking gesture detection model comprises inputting the transformed sensor data into the machine-learned smoking gesture detection model.

13. The wearable computing device of claim 1, wherein the operations further comprise:

collecting calibration data from a user-performed calibration gesture;

determining a device orientation based on the calibration data; and prior to inputting the sensor data into the machine-learned smoking gesture detection model, transforming the sensor data based at least in part on the device orientation determined from the calibration data and one or more rotation parameters associated with the determined device orientation;

wherein inputting the sensor data into the machine-learned smoking gesture detection model comprises inputting the transformed sensor data into the machine-learned smoking gesture detection model.

14. The wearable computing device of claim 1, further comprising:

a plurality of machine-learned smoking gesture detection models respectively associated with a plurality of different potential device orientations, each machine-learned smoking gesture detection model trained based at least in part on one or more positive examples that include sensor data descriptive of the smoking gesture performed with the corresponding device orientation;

wherein inputting the sensor data comprises respectively inputting the sensor data into each of the plurality of machine-learned smoking gesture detection models; and wherein receiving the gesture classification comprises receiving a plurality of gesture classifications respectively from the plurality of machine-learned smoking gesture detection models, wherein the smoking gesture is detected when at least one of the plurality of gesture classifications indicates the smoking gesture.

15. The wearable computing device of claim 1, wherein the operations further comprise:

prior to inputting the sensor data into the machine-learned smoking gesture detection model, respectively transforming the sensor data according to a plurality of sets of rotation parameters to obtain a plurality of sets of rotated sensor data, the plurality of sets of rotation parameters respectively associated with a plurality of potential device orientations;

wherein inputting the sensor data comprises respectively inputting the plurality of sets of rotated sensor data into the machine-learned smoking gesture detection model; and wherein receiving the gesture classification comprises receiving a plurality of gesture classifications respectively from the machine-learned smoking gesture detection model respectively for the plurality of sets of rotated sensor data, wherein the smoking gesture is detected when at least one of the plurality of gesture classifications indicates the smoking gesture.

16. The wearable computing device of claim 1, wherein the machine-learned smoking gesture detection model has been trained on a training data that includes one or more positive training examples that include sensor data indicative of the smoking gesture and one or negative training examples that include sensor data indicative of one or more of: a facial scratching gesture, a lipstick applying gesture, a yawning gesture, a coughing gesture, an eating gesture, and a drinking gesture.

* * * * *